United States Patent
Cichanowicz et al.

(10) Patent No.: US 8,603,401 B2
(45) Date of Patent: Dec. 10, 2013

(54) SELECTIVE CATALYTIC REDUCTION (SCR) REACTOR ASSEMBLY TO REMOVE FINE PARTICLES FROM POISONING OR INTERFERING WITH SCR CATALYST ACTIVITY IN BIOMASS FUEL APPLICATIONS

(75) Inventors: Joseph Edward Cichanowicz, Saratoga, CA (US); Lawrence Muzio, Laguna Niguel, CA (US)

(73) Assignee: Electric Power Research Institute, Inc., Charlotte, NC (US)

( * ) Notice: Subject to any disclaimer, the term of this patent is extended or adjusted under 35 U.S.C. 154(b) by 260 days.

(21) Appl. No.: 13/024,777

(22) Filed: Feb. 10, 2011

(65) Prior Publication Data

US 2011/0194986 A1    Aug. 11, 2011

Related U.S. Application Data

(60) Provisional application No. 61/303,378, filed on Feb. 11, 2010.

(51) Int. Cl.
*B01D 50/00* (2006.01)

(52) U.S. Cl.
USPC ......................................................... 422/176

(58) Field of Classification Search
USPC .................................................. 422/177, 180
See application file for complete search history.

(56) References Cited

U.S. PATENT DOCUMENTS

| | | | |
|---|---|---|---|
| 5,318,755 A * | 6/1994 | Kuivalainen et al. | 422/171 |
| 5,540,755 A * | 7/1996 | Spokoyny et al. | 95/3 |
| 6,245,134 B1 * | 6/2001 | Sandler | 96/417 |
| 7,063,817 B2 * | 6/2006 | Sigling | 422/171 |

* cited by examiner

*Primary Examiner* — Tom Duong
(74) *Attorney, Agent, or Firm* — Trego, Hines & Landenheim, PLLC

(57) ABSTRACT

The present invention relates to a selective catalytic reduction (SCR) reactor assembly for removing fine particles that interfere with SCR catalyst activity in biomass fuel applications. The selective catalytic reduction (SCR) reactor assembly includes at least one turning vane disposed in a plenum chamber of the reactor, at least one rectifier layer disposed downstream of the at least one turning vane, and at least one active catalyst layer for removing particulate matter. The turning vane is adapted to impart a directional turn to the flue gas flowing through the reactor, and the at least one rectifier ensures even flow distribution.

11 Claims, 1 Drawing Sheet

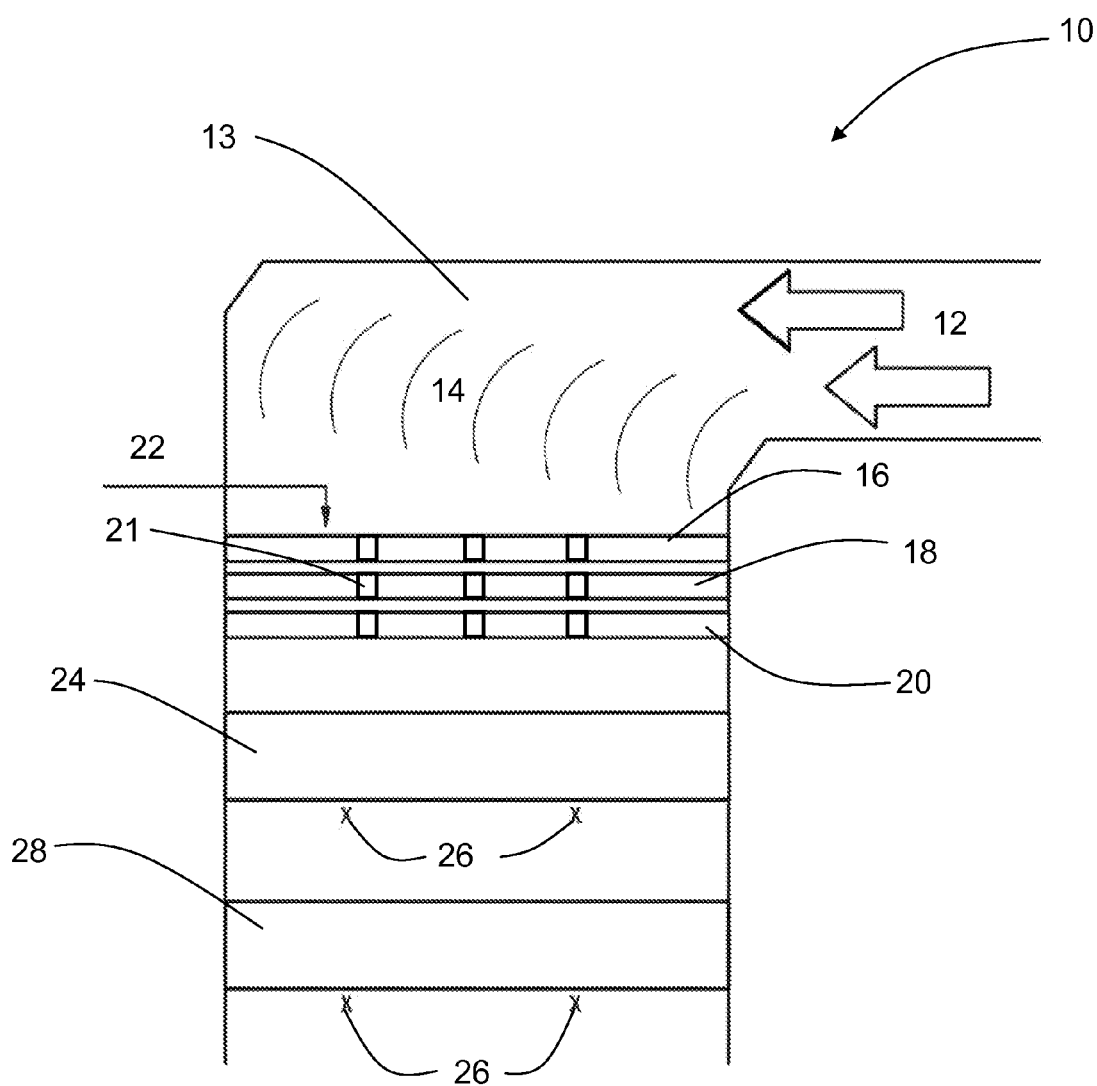

SELECTIVE CATALYTIC REDUCTION (SCR) REACTOR ASSEMBLY TO REMOVE FINE PARTICLES FROM POISONING OR INTERFERING WITH SCR CATALYST ACTIVITY IN BIOMASS FUEL APPLICATIONS

This application claims the benefit of Provisional Application No. 61/303,378 filed on Feb. 11, 2010.

BACKGROUND OF THE INVENTION

The present invention relates generally to the removal of fine particles in biomass applications and, more specifically, to a selective catalytic reduction (SCR) reactor assembly for removing fine particles that interfere with SCR catalyst activity in biomass fuel applications.

The use of biomass fuel is considered an important option in mitigating the production of carbon dioxide ($CO_2$) emissions from generating units designed to fire conventional fossil fuels. Although there is no generally accepted definition of biomass fuels, most observers consider organic waste streams and energy crops to comprise this category of fuels.

The key attraction of biomass fuels is that they are considered carbon neutral—the $CO_2$ released by combustion was fixed or removed from the atmosphere, by photosynthesis, so its return does not provide a net carbon addition. The International Energy Association (IEA) has explored the co-firing of various types of biomass fuels, assessing potential benefits in numerous European countries. Specifically, the IEA and other research organizations in the European community have explored biomass co-firing in Central European countries such as Germany, the Netherlands, and Belgium where the energy infrastructure evolved based on broad availability of fossil fuels. In many cases co-firing biomass fuels also contributes to reducing combustion emissions of $SO_2$, $NO_x$, and particulate matter.

One potential downside to co-firing biomass with coal is the compromise to the performance of selective catalytic reduction (SCR) $NO_x$ control systems, specifically through accelerated deactivation of catalyst. Depending on the degree of catalyst deactivation, and the cost impact of accelerated catalyst replacement, a compromise to the effectiveness of SCR $NO_x$ control could limit biomass co-firing. Within the U.S., a total of approximately 112 GW of coal-fired generating capacity is presently equipped with SCR $NO_x$ control, and more than 120 GW is anticipated by 2012. Many of these SCR-equipped units are candidates for co-firing biomass fuels. The prospect of co-firing these units with biomass fuels and compromising $NO_x$ control, or significantly increasing in catalyst replacement, could limit the applicability of this $CO_2$-mitigating technique to SCR-equipped units.

Table 1 compares the key features of several categories of solid biomass fuels to coals. The biomass fuels considered in this table are various wood products and wood residues, as well as grasses such as willows and straw. Agricultural byproducts such as olive residues are also shown.

Several features distinguish biomass fuels from coals. The relatively high moisture content is perhaps the most notable feature, and comprises a disadvantage as it lowers heating value of the fuel. The ash content of biofuels varies over a very wide range, from as high as 20% to less than 1%. Biomass fuels contain low concentrations of sulfur and nitrogen compared to coal, but can have higher chlorine. Notably, the content of trace elements such as strong alkali (e.g., potassium) can be several orders of magnitude higher compared to most coals.

Also, as shown, the potassium content of most biomass fuels is orders of magnitude higher than in coal. Perhaps more important than the quantity of potassium is the physical and chemical form. In contrast to coal where potassium exists mostly as a metal oxide, biomass fuels contain potassium as an organically bound salt, usually potassium chloride (KCl) or sulphate ($K_2SO_4$). This form of potassium enables volatilization easier than if the potassium exists as a metal oxide. Further, this form of potassium within biomass fuels allows fine particles to be generated, which are the major poisons for SCR catalyst.

TABLE 1

| Property | Coal | Peat | Wood without Bark | Bark | Forest Residues (coniferous tree with needles) | Willow | Straw | Reed Canary Grass (Spring harvested) | Olive Residues |
|---|---|---|---|---|---|---|---|---|---|
| Ash Content, % (d) | 8.5-10.9 | 4-7 | 0.4-0.5 | 2-3 | 1-3 | 1.1-4.0 | 5 | 6.2-7.5 | 2-7 |
| Moisture Content, % | 6-10 | 40-55 | 5-60 | 45-65 | 50-60 | 50-60 | 17-25 | 15-20 | 60-70 |
| Net Calorific Value, Btu/lb | 11,178-12,167 | 8,985-9,157 | 7,954-8,598 | 7,954-9,888 | 7,954-8,598 | 7,954-8,255 | 7,481 | 7,352-7,524 | 7,524-8,168 |
| Carbon, % (d) | 76-87 | 52-56 | 48-52 | 48-52 | 48-52 | 47-51 | 45-47 | 45.5-46.1 | 48-50 |
| Hydrogen, % (d) | 3.5-5 | 5-6.5 | 6.2-6.4 | 5.7-6.8 | 6-6.2 | 5.8-6.7 | 5.8-6.0 | 5.7-5.8 | 5.5-6.5 |
| Nitrogen, % (d) | 0.8-1.5 | 1-3 | 0.1-0.5 | 0.3-0.8 | 0.3-0.5 | 0.2-0.8 | 0.4-0.6 | 0.65-1.04 | 0.5-1.5 |
| Oxygen, % (d) | 2.8-11.3 | 30-40 | 38-42 | 24.3-40.2 | 40-44 | 40-46 | 40-46 | 44 | 34 |
| Sulfur, % (d) | 0.5-3.1 | <0.05-0.3 | <0.05 | <0.05 | <0.05 | 0.02-0.10 | 0.05-0.2 | 0.08-0.13 | 0.07-0.17 |
| Lead, % (d) | <0.1 | 0.02-0.06 | 0.01-0.03 | 0.01-0.03 | 0.01-0.04 | 0.01-0.05 | 0.14-0.97 | 0.09 | 0.1* |
| Potassium, % (d) | 0.003 | 0.8-5.8 | 0.02-0.5 | 0.1-0.4 | 0.1-0.4 | 0.2-0.5 | 0.69-1.3 | 0.3-0.5 | 30* |
| Calcium, % (d) | 4-12 | 0.05-0.1 | 0.1-1.5 | 0.02-0.08 | 0.2-0.9 | 0.2-0.7 | 0.1-0.6 | 9 | |

Early work in the role of alkali compounds poisoning SCR active sites demonstrated that stronger alkali such as sodium and potassium were key. In particular, it was found that potassium asserted a significant impact on catalyst activity. Further research conducted to diagnose biomass-derived deactivation, has focused on not only the composition of alkali materials, but the physical form, specifically, submicron particles. As examples, work conducted by Kling, Larsson, and Zheng have addressed not just the composition, but particle size of materials that form aerosols, and are believed to be key in prompting catalyst deactivation.

The effect of biomass on SCR catalyst activity entails the following three steps: (a) evaporation and volatilization of organically bound minerals and salts within the furnace or combustion system, (b) condensation of these vaporized species forming small aerosol particles, (c) deposition of aerosols on the catalyst surface, and (d) diffusion and reaction of aerosols within the catalyst, specifically the pores. The first two mechanisms are not relevant to the present invention and will not be further discussed. The latter two mechanisms are discussed as further background material for the present invention.

The deposition of predominantly potassium-containing aerosol particles on the surface of SCR catalyst has been observed in bench-scale tests. More specifically, fouling by $K_2SO_4$ and KCL submicron particles has been observed in laboratory bench-scale reactors. The results suggest that such aerosol particle fouling is more severe than in coal-fired applications due to the small size of the particles and their susceptibility to Brownian and turbulent diffusion. The absence of large particles in the flue gas is also a factor. As KCl and $K_2SO_4$ have lower melting points than typical coal ash, the greater stickiness may also contribute to the rapid accumulation. These measurements strongly implicate potassium-based compounds—specifically KCl and $K_2SO_4$—as key contributors to SCR catalyst deactivation.

The consequence of this observation, in terms of mitigating countermeasures, is that submicron aerosols are highly mobile in defusing to the catalyst surface. The presence of large particles that obstruct this diffusion or of laminar-line conditions that minimizes mass transfer coefficients are favored.

Mechanistically, Zheng showed by SEM-EDX measurements that potassium compounds penetrate into the catalyst wall, and further that Bronsted acid sites critical for catalytic activity reacted with potassium and were rendered inactive.

The penetration of KCl to the active site is more prone to poisoning than $K_2SO_4$. Zheng suggests that submicron particles are required for potassium penetration. These general observations—that alkali submicron particles generally less than 100 nm penetrate into catalyst pores and are key behind deactivation—are supported by observations by Kling.

Of note in these observations is the susceptibility of the catalyst to submicron particles, the latter driven by Brownian motion. In coals, the potassium and other inorganic minerals are associated with minerals, whereas in biomass, alkali metals are associated with salts or part of the organic matrix. The latter are more easily released to the fuel at combustion temperatures.

At present, there are no countermeasures to the deactivation of SCR catalyst by biomass fuels, as imparted by the submicron particles. Some attempts have been offered to change the form of the offending potassium submicron particles to a state that is less soluble, but these to date have not been successful.

Accordingly, a simple approach to remove fine particles and prevent their penetration into the catalyst surface is needed.

BRIEF SUMMARY OF THE INVENTION

These and other shortcomings of the prior art are addressed by the present invention, which provides an SCR reactor assembly for removing fine particles in biomass fuel applications.

According to an embodiment of the invention, a selective catalytic reduction (SCR) reactor assembly for removing particulate matter from the SCR reactor includes at least one turning vane disposed in a plenum chamber of the reactor, the turning vane being adapted to impart a directional turn to flue gas flowing through the reactor; at least one rectifier layer disposed downstream of the at least one turning vane such that the flue gas passes through the at least one rectifier and the at least one rectifier ensures even flow distribution; and at least one active catalyst layer adapted to remove particulate matter from the flue gas.

BRIEF DESCRIPTION OF THE DRAWINGS

The subject matter that is regarded as the invention may be best understood by reference to the following description taken in conjunction with the accompanying drawing FIGURE in which:

FIG. 1 shows an SCR catalyst reactor according to an embodiment of the invention.

DETAILED DESCRIPTION OF THE INVENTION

The equipment and materials described, provides surface area that can act as a sink for the removal of submicron potassium particles. The transport of fine aerosols can be promoted by insuring continuous turbulent flow within the catalyst substrate, which can promote particle removal.

As background, the flow field at the inlet of a conventional SCR catalyst, or a rectifier or straightener grid, is initially in a turbulent state, with such flow reverting to laminar after a sufficient entry length has been experienced. This initial entry zone depends on the length/diameter ratio of the inlet structure. For most commercial SCR catalyst structures, this length is about 300 mm. In this zone turbulent diffusion predominates, with the transport coefficients significantly high for small aerosol particles.

These surfaces could be presented to the flow surface by using catalyst substrate material, configured in the same geometry as active catalyst. Several short sections of substrate could be used, each length characterized by turbulent flow. As a consequence, high mass transfer coefficients are induced, and transport of submicron aerosol particles to the substrate wall promoted. The aerosol particles that accumulate on the substrate can be removed by sootblowing.

Submicron aerosol particles will also deposit on larger fly ash particles contained in the flue gas, which will penetrate the catalyst and exit the reactor with the fly ash. Consequently, two surfaces provide sinks—the wall of the inert grid rectifier and that of the fly ash—where aerosol particles can migrate and be removed from the flue gas.

Referring now specifically to the drawing, an exemplary SCR reactor assembly according to an embodiment of the invention is illustrated in FIG. 1 and shown generally at reference numeral 10. FIG. 1 depicts a simple schematic arrangement of the present invention. As shown, the inlet ductwork to the SCR reactor 10, where flue gas streams 12 enter a plenum chamber 13 for the reactor 10. The flue gas flow 12 enters a series of turning vanes 14, that imparts a directional turn to the flue gas vertically down into the lower portion of the reactor.

Subsequent to this location, the flue gas enters three rectifier layers 16, 18, and 20, configured of conventional substrate that is used for SCR catalyst to ensure even flow distribution, and include a plurality of channels 21 designed to maximize turbulent flow therein and promote collection of aerosol particles. The material can be composed of the same or similar to that used for SCR catalyst; that is either the conventional "grid" or "plate" type arrangement. The geometrical characteristics, such as the pitch or opening for the grid-type geometry, or the plate spacing or hydraulic diameter for the plate-type geometry, can be the same or differ compared to a conventional SCR catalyst. The substrate may or may not contain active ingredients for $NO_x$ removal. In fact, a possible use for deactivated SCR catalyst in this manner is to provide for such rectifier material. The three layers are shown only as an example, and any other number of layers in a consecutive series could be utilized.

Also present in this zone is a catalyst cleaning device 22, such as a sootblower or acoustic horn, by which to remove accumulated materials from the surface.

Subsequent to the rectifier layers 16, 18, and 20, the flue gas 12 enters a first active catalysts layer 24 and a second active catalyst layer 28. These catalyst layers 24, 28 are supported by structural steel members 26.

In the present case, the pitch or opening of the grid-type or plate-type material is selected as the same as the active catalyst material. The rectifier layers 16, 18, 20 in this case are assumed to be of grid-type geometry, with cell openings for gas and particle flow of 7 mm, and be of 25 cm in length.

A series of calculations were conducted based on modeling the Brownian motion of aerosol particles, the rate at which such particles collide with the substrate wall, and with an assumed distribution of fly ash particles. The underlying assumptions are selected to reflect realistic conditions.

Table 2 presents results showing the total quantity of biomass particle removal by both the substrate and fly ash particle surfaces. The total removal quantity is presented as a function of the biomass particle size, for the smallest particle sizes considered (0.01 microns) to the largest (3 microns). Also shown is the influence of the size of the coal ash particle on the total removal, due to the role in particle-to-particle contact.

Table 2 shows the total mass deposition rate to be a strong function of particle size, with significant mass removal occurring for particle sizes less than $1/100$ micron. Significant removal of biomass particles is achieved even for particles of 1/10 of a micron, and even approaching 1/5 of a micron.

TABLE 2

| Coal Ash | | | Biomass Size | | | | | | | |
|---|---|---|---|---|---|---|---|---|---|---|
| d Microns | 360W mg/m^3 | % | 0.01 | 0.09 | 0.18 | 0.36 | 0.71 | 1 | 2 | 3 |
| | | | Percent of Biomass of size d Removed (Collisions & Wall Diffusion) | | | | | | | |
| 0.004 | 0 | 0.0 | 100.00 | 100.00 | 100.00 | 100.00 | 100.00 | 100.00 | 100.00 | 100.00 |
| 0.2 | 270 | 1.9 | 100.00 | 91.48 | 62.54 | 26.93 | 16.95 | 11.25 | 8.77 | 7.27 |
| 0.4 | 180 | 1.3 | 100.00 | 43.67 | 19.85 | 6.34 | 3.36 | 2.22 | 1.65 | 1.31 |
| 0.6 | 0 | 0.0 | 89.21 | 22.12 | 9.07 | 2.59 | 1.38 | 0.85 | 0.64 | 0.60 |
| 1 | 1000 | 7.1 | 84.31 | 8.54 | 3.30 | 0.93 | 0.45 | 2.29 | 0.21 | 0.15 |
| 2 | 2548 | 18.2 | 18.45 | 2.29 | 0.65 | 0.23 | 0.11 | 0.07 | 0.05 | 0.04 |
| 5 | 3545 | 25.3 | 4.28 | 0.49 | 0.18 | 0.05 | 0.02 | 0.01 | 0.01 | 0.01 |
| 10 | 4454 | 31.8 | 2.07 | 0.24 | 0.09 | 0.02 | 0.01 | 0.01 | 0.00 | 0.00 |
| 20 | 2000 | 14.3 | 1.52 | 0.17 | 0.05 | 0.02 | 0.01 | 0.00 | 0.00 | 0.00 |

This degree of mass removal can provide for aerosol particle removal rates that are meaningful to protect the catalyst. For example, it is known that significant active pore volume is presented by catalyst pores of 0.02 microns or less. Consequently, the results in Table 2 suggest that submicron aerosol particles less than this size—presumed to be mobile and capable of penetrating catalyst pores and compromising activity—can be removed. Controlling the amount of such small particles, that are believed to contribute significantly to catalyst deactivation, can retain catalyst activity.

The foregoing has described a selective catalytic reduction (SCR) reactor assembly for removing fine particles that interfere with SCR catalyst activity in biomass fuel applications. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A selective catalytic reduction (SCR) reactor assembly for removing particulate matter from the SCR reactor, comprising:

(a) at least one turning vane disposed in a plenum chamber of the reactor, the turning vane being adapted to impart a directional turn to flue gas flowing through the reactor;

(b) at least one rectifier layer disposed downstream of the at least one turning vane such that the flue gas passes through the at least one rectifier, the at least one rectifier layer being adapted to ensure even flow distribution and includes a plurality of channels adapted to promote turbulent flow therein and promote collection of aerosol particles, thereby providing protection to an active catalyst from being deactivated by the aerosol particles; and (c) at least one active catalyst layer adapted to remove NOx from the flue gas.

2. The assembly according to claim 1, wherein the at least one turning vane has a curvature to receive the flue gas and impart the directional turn.

3. The assembly according to claim 1, wherein the at least one turning vane is concave to receive the flue gas and impart the directional turn.

4. The assembly according to claim 1, further including a plurality of turning vanes distributed across the plenum chamber of the reactor.

5. The assembly according to claim 1, further including a catalyst cleaning device adapted to remove accumulated materials on a surface of the at least one rectifier.

6. The assembly according to claim 5, wherein the catalyst cleaning device is a soot blower.

7. The assembly according to claim 5, wherein the catalyst cleaning device is an acoustic horn.

8. The assembly according to claim 1, wherein the at least one rectifier has a cell opening for gas and particulate flow of about 7 millimeters.

9. The assembly according to claim 1, wherein the at least one rectifier layer includes an inert material for removal of NOx.

10. The assembly according to claim 1, wherein the at least one rectifier layer is made of used SCR catalyst material.

11. The assembly according to claim 1, wherein the at least one rectifier layer is made of SCR catalyst material.

* * * * *